United States Patent
Chu et al.

(10) Patent No.: US 9,264,557 B2
(45) Date of Patent: Feb. 16, 2016

(54) CHARGING SYSTEMS AND METHODS FOR TELECOMMUNICATIONS

(71) Applicant: Telefonaktiebolaget L M Ericsson (publ), Stockholm (SE)

(72) Inventors: Chris Chu, Karlskrona (SE); Peter Löwenadler, Karlskrona (SE); Björn Ringberg, Rödeby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 76 days.

(21) Appl. No.: 13/896,417

(22) Filed: May 17, 2013

(65) Prior Publication Data
US 2014/0227994 A1 Aug. 14, 2014

Related U.S. Application Data

(60) Provisional application No. 61/762,687, filed on Feb. 8, 2013.

(51) Int. Cl.
*H04M 11/00* (2006.01)
*H04M 15/00* (2006.01)

(52) U.S. Cl.
CPC ............ *H04M 15/61* (2013.01); *H04M 15/775* (2013.01); *H04M 15/785* (2013.01); *H04M 15/8228* (2013.01)

(58) Field of Classification Search
CPC ..................................................... H04M 15/61
USPC ................... 455/406, 418–422.1; 379/114.28
See application file for complete search history.

(56) References Cited

U.S. PATENT DOCUMENTS

| 8,290,471 B1 | 10/2012 | Jones et al. |
| 2002/0022472 A1 | 2/2002 | Watler et al. |

(Continued)

FOREIGN PATENT DOCUMENTS

| EP | 1 881 688 A1 | 1/2008 |
| EP | 2 466 866 A1 | 6/2012 |

(Continued)

OTHER PUBLICATIONS

International Search Report and Written Opinion mailed Oct. 27, 2009 in PCT application PCT/SE2009/050849.

(Continued)

*Primary Examiner* — Babar Sarwar
(74) *Attorney, Agent, or Firm* — Baker Botts, LLP

(57) ABSTRACT

Methods in a charging system (20), in a charging node or charging server comprise associating plural telecommunications services (S) with a product (P) and creating a product instance, the product instance being available to a subscriber entity and having a product instance lifecycle. The methods further comprise, upon receiving a service reservation, checking whether the service reservation is for a first reserved service of the plural telecommunication services associated with the product instance and, if so, reserving a fee for the product instance against a payor account. The methods further comprise, upon receiving a first notification of use by the subscriber entity of any of the plural services associated with the product instance, posting the fee to the payor account. The methods further comprise thereafter permitting use of all of the plural telecommunication services associated with the product instance to the subscribing entity during the product instance lifecycle without deducting a further fee for use of the plural telecommunication services associated with the product instance.

12 Claims, 12 Drawing Sheets

(56) References Cited

U.S. PATENT DOCUMENTS

| | | | |
|---|---|---|---|
| 2002/0173291 | A1 | 11/2002 | Hutcheson et al. |
| 2004/0121758 | A1 | 6/2004 | Hoche et al. |
| 2006/0019630 | A1 | 1/2006 | Sposato et al. |
| 2007/0149849 | A1 | 6/2007 | Karlsson |
| 2007/0286367 | A1* | 12/2007 | McCann et al. ........... 379/114.2 |
| 2008/0318604 | A1* | 12/2008 | Titus et al. .................... 455/466 |
| 2009/0076952 | A1 | 3/2009 | Cadenas et al. |
| 2010/0104076 | A1 | 4/2010 | Abrahamsson et al. |
| 2010/0144310 | A1* | 6/2010 | Bedingfield et al. .......... 455/405 |
| 2011/0086611 | A1 | 4/2011 | Klein et al. |

FOREIGN PATENT DOCUMENTS

| | | |
|---|---|---|
| GB | 2 322 771 A | 9/1998 |
| WO | 2006/010156 A2 | 1/2006 |
| WO | 2007/106563 A2 | 9/2007 |
| WO | 2008/055700 A1 | 5/2008 |
| WO | 2009/108188 A1 | 9/2009 |

OTHER PUBLICATIONS

U.S. Appl. No. 13/464,397, filed May 4, 2012, entitled "Product-Centric Charging System and Method".

U.S. Appl. No. 13/538,340, filed Jun. 24, 2012, entitled "Telecommunications Charging With Externally-Controlled Account Selection".

3GPP TS 32.299 V11.6.0, $3^{rd}$ Generation Partnership Project; Technical Specification Group Services and System Aspects; Telecommunication Management; Charging Management; Diameter Charging Application (Release 11) (Dec. 2012).

3GPP TS 32.251 V12.0.0 (Dec. 2012); 3rd Generation Partnership Project; Technical Specification Group Services and System Aspects; Telecommunication Management; Charging Management; Packet Switched Domain Charging (Release 12).

RFC 3588, Calhoun et al, "Diameter Base Protocol", Sep. 2003.

RFC 4006, Hakala et al, Diameter Credit-Control Application, Aug. 2005.

Office Action mailed Mar. 30, 2012 in U.S. Appl. No. 12/258,990.

Final Office Action mailed Apr. 26, 2013 in U.S. Appl. No. 12/258,990.

Office Action mailed Dec. 11, 2012 in U.S. Appl. No. 13/464,397.

* cited by examiner

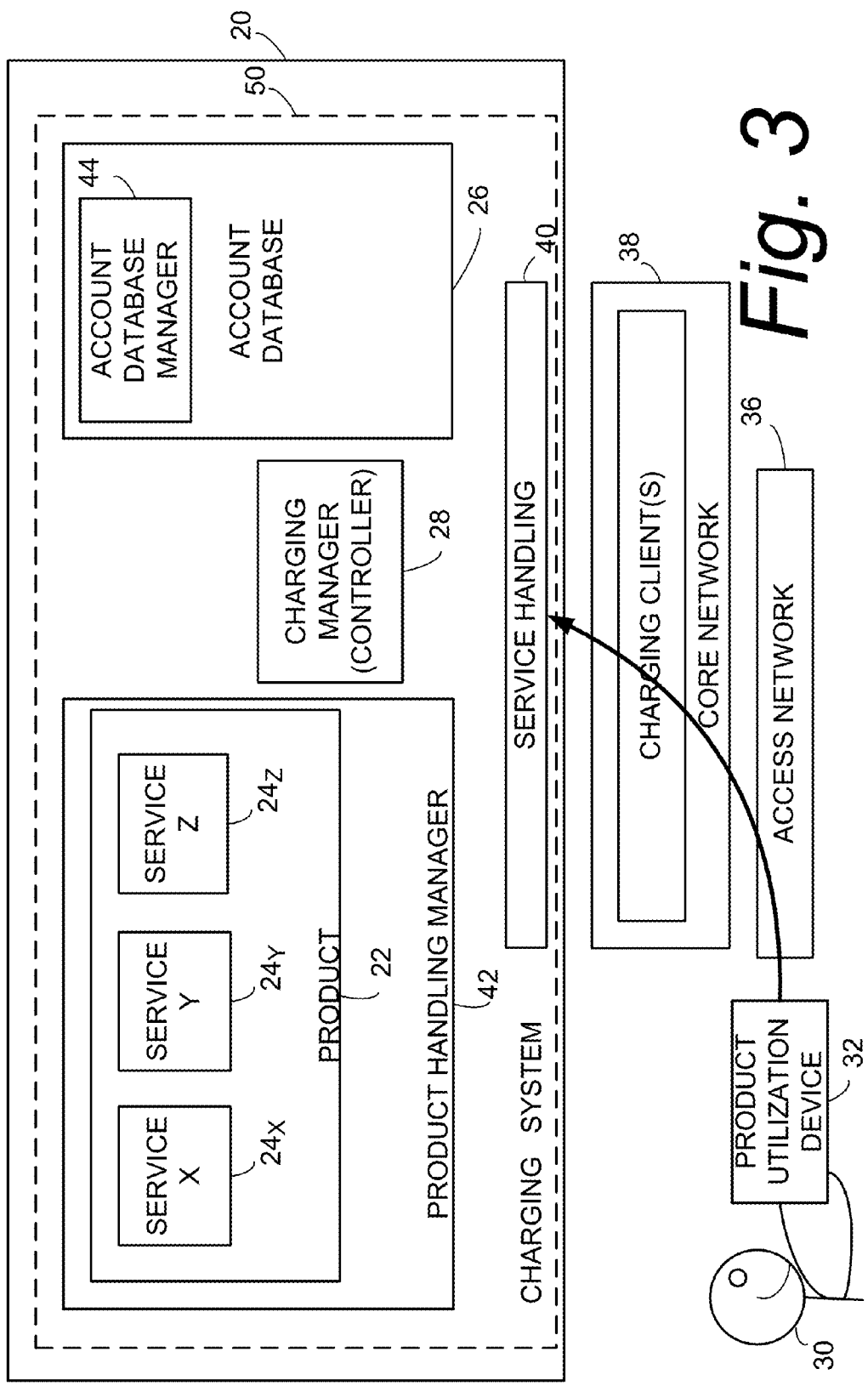

CHARGING SYSTEMS AND METHODS FOR TELECOMMUNICATIONS

This application claims the priority of U.S. Provisional Patent application 61/762,687, filed Feb. 8, 2013, which is incorporated herein by reference in its entirety.

TECHNICAL FIELD

The technology relates to charging or financial account rendering for use of services, such as telecommunications services, for example.

BACKGROUND

For many products and/or services a customer or subscriber desires that a financial charge for the product/service be satisfied or paid from one or more of accounts, e.g., asset accounts owned by the customer or authorized for the customer's use. The debiting of the appropriate accounts, or reserving of assets in the appropriate accounts, is generally handled by a charging system. An example of an online charging system (OCS) is described in U.S. patent application Ser. No. 12/258,990 of ABRAHAMSSON et al, entitled REAL-TIME FLEXIBLE ACCOUNT SELECTION FOR COMMUNICATIONS, which is incorporated herein by reference.

An online charging system (OCS) generally performs charging authorization for use of a service or a set of services. When a subscriber starts to use a service, the OCS either authorizes or denies the subscriber relative to the service sought. If the subscriber is allowed to use the service, the OCS authorizes an amount or quota that the subscriber can use for the service before seeking new authorization. The OCS can also set a time limit for how long the subscriber can use the authorized quota before seeking new service authorization. The quota is typically data volume and/or time, but can also be defined by the service provider (for example charging for electricity using kw/hour as quota unit).

In real-time session-based charging, common data that is shared by different sessions/activities can be modified by these sessions/activities. When a session/activity has initiated an action, subsequent sessions/activities may initiate the same action again. If the action requires reserving the users' (subscribers') resources, then the users' resources will be reserved for each action initiated by a session/activity.

In order to commit the initiated action, the session/activity must fulfill certain update conditions. An action initiated by a session must be committed by the same session.

One problem with the existing solution of common data modification is that the shared data can be modified by the same action initiated repeatedly by parallel sessions/activities. The sessions can be initiated by the same user or by different users sharing common data. The repeated actions will cause an undesired effect. If the action requires reserving the users' resources, then the unwanted repeated actions will tie up the users' resources. Another problem is that the initiated action has to be committed by the session that initiated it. Even if another session has fulfilled the commit conditions earlier, it cannot commit the action initiated by that session. This causes a delay in the commit action and plausibly ties up the users' resources even longer.

SUMMARY

In accordance with an aspect of the technology disclosed herein, if several parallel sessions/activities can initiate the same action, e.g. reserve a fee or set a state, which affects shared data, then after the first session/activity has initiated the action, no subsequent sessions/activities should initiate the same action again. When any session/activity fulfills the update conditions, the action will be committed, e.g. deduct a fee regardless of which session has initiated the action.

In one of its aspects, the technology disclosed herein concerns a method in a charging system, and particularly in a charging node or charging server. The method comprises associating plural telecommunications services with a product and creating a product instance, the product instance being available to a subscriber entity and having a product instance lifecycle. The method further comprises, upon receiving a service reservation, checking whether the service reservation is for a first reserved service of the plural telecommunication services associated with the product instance and, if so, reserving a fee for the product instance against a payor account. The method further comprises, upon receiving a first notification of use by the subscriber entity of any of the plural services associated with the product instance, posting the fee to the payor account. The method further comprises thereafter permitting use of all of the plural telecommunication services associated with the product instance to the subscribing entity during the product instance lifecycle without deducting a further fee for use of the plural telecommunication services associated with the product instance.

In one of its aspects the technology disclosed herein concerns a method in a node of a telecommunications charging system. The method comprises associating plural telecommunications services with a product and creating a product instance, the product instance being available to a subscriber entity and having a product instance lifecycle. The method further comprises reserving a product fee for the product instance against a payor account upon receipt of a first service reservation of a first reserved service of the plural telecommunication services associated with the product instance. The method also comprises posting the product fee against the payor account in conjunction with use of one of the plural telecommunication services associated with the product instance, and thereafter permitting use of all of the plural telecommunication services associated with the product instance to the subscribing entity during the product instance lifecycle without posting a further fee for use of the plural telecommunication services associated with the product instance.

In an example embodiment and mode, the subscriber entity comprises plural users.

In an example embodiment and mode, the method further comprises upon receiving a subsequent reservation for another reserved service of the plural telecommunication services associated with the product instance, not reserving a further fee for the product instance against the payor account.

In an example embodiment and mode, the method further comprises: (1) upon receiving the reservation for the first reserved service of the plural telecommunication services associated with the product instance, enabling reservation of telecommunications resources for the first reserved service; and (2) upon receiving the subsequent reservation for the another reserved service of the plural telecommunication services associated with the product instance, enabling reservation of telecommunications resources for the another reserved service.

In an example embodiment and mode, the method further comprises, (3) upon receiving the reservation for the first reserved service of the plural telecommunication services associated with the product instance, granting a first quota of telecommunications resources for the first reserved service; and (4) upon receiving the subsequent reservation for the another reserved service of the plural telecommunication services associated with the product instance, granting another quota of telecommunications resources for the another reserved service.

In an example embodiment and mode, the method further comprises posting the fee against the payor account upon first reported utilization of a granted quota.

In an example embodiment and mode, the product instance lifecycle is a function of at least one of a time duration parameter and availability of a product resource allocated to the product instance.

In another of its aspects the technology disclosed herein concerns a charging node for telecommunications system wherein plural telecommunications services are associated with a product for which a product instance is allocated to a subscriber entity. The charging node comprises a charging controller configured: (1) to reserve a product fee for the product instance against a payor account upon receipt of a first service reservation of a first reserved service of the plural telecommunication services associated with the product instance; (2) to post the product fee against the payor account in conjunction with use of one of the plural telecommunication services associated with the product instance; and thereafter (3) to permit use of all of the plural telecommunication services associated with the product instance to the subscribing entity during a product instance lifecycle without posting a further product fee for use of the plural telecommunication services associated with the product instance.

In an example embodiment, the charging controller is configured to make no further product fee reservation upon receiving a subsequent reservation for another reserved service of the plural telecommunication services associated with the product instance of the product.

In an example embodiment, the node further comprises a product handler; an account manager; and, a service manager. The product handler is configured to associate the plural telecommunications services with the product and to generate the product instance for the subscriber entity, the product instance being available to the subscriber entity and having the product instance lifecycle. The account manager is configured to handle the payor account associated with the product instance. The service manager is configured to receive the service reservations and at least one usage notification for the plural telecommunications services associated with the product instance.

In an example embodiment the product handler is configured to maintain in memory both product fee reservation information and product fee posting information for the instance of the product. The account manager is further configured to post the product fee to the payor account when the product fee posting information comprises a product fee posting indicator. The charging controller is further configured: (a) to store a product fee reservation indicator in the product fee reservation information only upon receiving a service reservation for a first reserved service of the plural telecommunication services associated with the instance of the product; (b) upon receiving a subsequent reservation for another reserved service of the plural telecommunication services associated with the instance of the product, to ascertain existence of the product fee reservation indicator and make no further fee reservation; (c) to store the product fee posting indicator in the product fee posting information only upon receiving a notification of use by the subscriber entity of any of the plural services associated with the instance of the product.

In an example embodiment, the charging controller is further configured: (1) upon receiving the reservation for the first reserved service of the plural telecommunication services associated with the product instance, to grant a first quota of telecommunications resources for the first reserved service; and (2) upon receiving the subsequent reservation for the another reserved service of the plural telecommunication services associated with the product instance, to grant another quota of telecommunications resources for the another reserved service.

In an example embodiment, the charging controller is further configured to post the fee against the payor account upon first reported utilization of a granted quota.

In an example embodiment the product instance lifecycle is a function of at least one of a time duration parameter and availability of a product resource allocated to the product instance.

In another of its aspects the technology disclosed herein concerns a computer program product comprising instructions stored on non-transient computer-readable media. When executed by a processor, the instructions perform the acts of: (1) associating plural telecommunications services with a product and generating a product instance for a subscriber entity, the product instance being available to the subscriber entity and having a product instance lifecycle; (2) reserving a product fee for the product instance against a payor account upon receipt of a first service reservation of a first reserved service of the plural telecommunication services associated with the product instance; (3) posting the product fee against the payor account in conjunction with use of one of the plural telecommunication services associated with the product instance; and thereafter (4) permitting use of all of the plural telecommunication services associated with the product instance to the subscribing entity during the product instance lifecycle without posting a further fee for use of the plural telecommunication services associated with the product instance.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 3 is a schematic view of a charging system according to an example, more detailed embodiment well as an example context in which the charging system operates.

DETAILED DESCRIPTION

Figure 1:
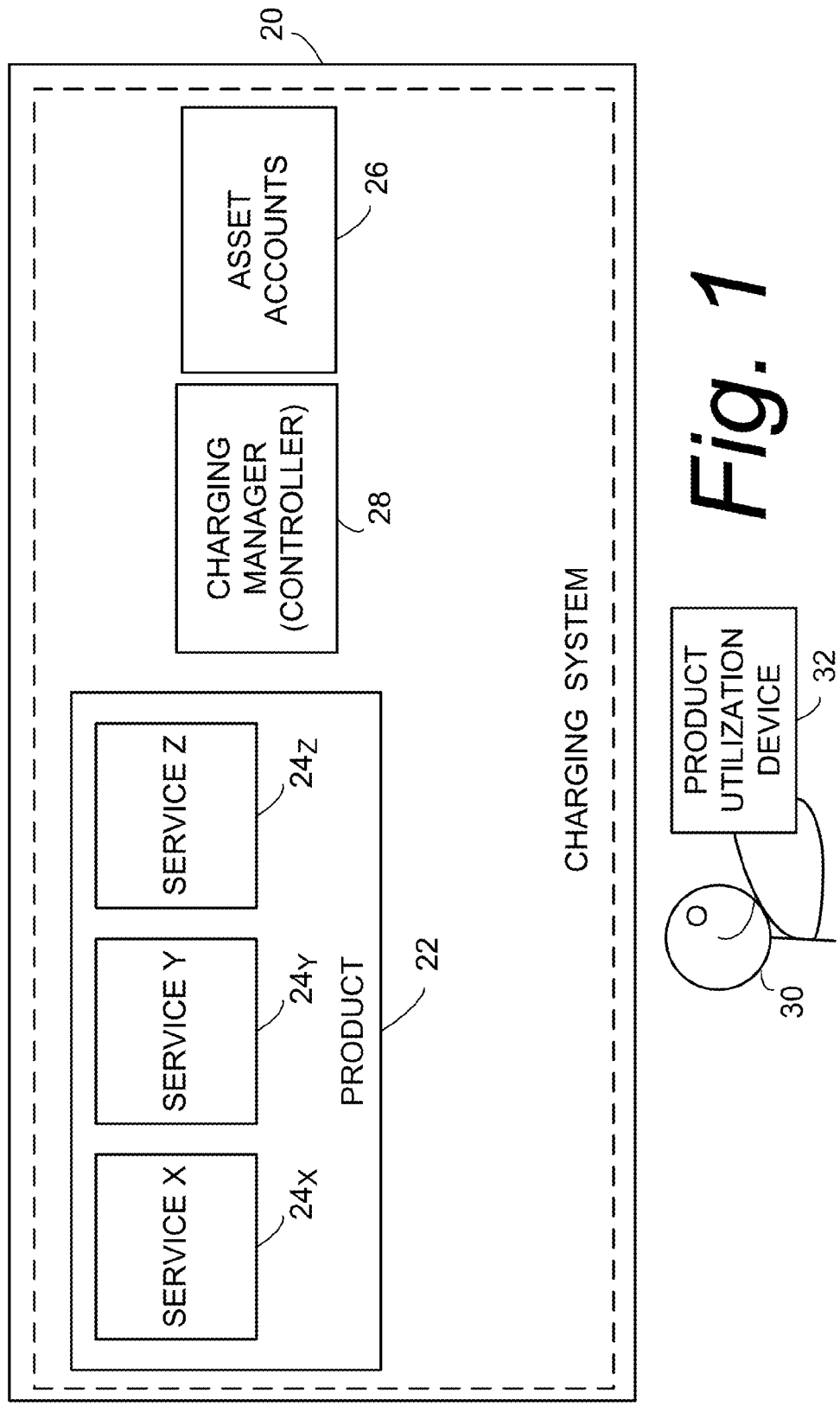
FIG. 1 is a schematic view of a generic charging system according to an example embodiment, shown as being accessed by a product consumer through a product utilization device.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 illustrates an example, generic embodiment of an online charging system (OCS) 20 which, upon first usage of a service bundled with product (such as product 22) associated with plural services (such as services $24_X$, $24_Y$, and $24_Z$), posts or charges a fee to one or more appropriate accounts 26 to charge for the use of the product. FIG. 1 particularly shows that charging system 20 comprises charging manager 28 (also known as charging controller 28) which has access to and/or operates on the accounts or posting or charging a fee to one or more appropriate accounts 26 for the usage of the product. The posting or charging of the fee for the usage may take the form of an actual real time debit from the appropriate account(s), either as a real time decrement of a prepaid amount for a prepaid account(s) or as a real time increase in a balanced owed for postpaid account. Once the charging system 20 posts the charge to the appropriate account(s) for the first use of a service included in the product, other services included in the product may be used by a subscriber or user of the product without additional fee incurred by the subscriber or user of the product during the lifecycle of the product.

In an example implementation, when a customer purchases or otherwise acquires a product, an instance of an entity representing the purchased product is created for the customer. For example, the instance representing the purchased product for the customer may be a program or software entity.

The plural services 24 described herein may be diverse parallel services such as voice service, mobile broadband, short message service (SMS), just to name a few. Within mobile broadband charging, different data services may be categorized, e.g., could charge for data applied to Facebook or YouTube separately, and thus recognized as two different and parallel services.

As used herein, a "product" is not limited to a device or apparatus, but may comprise any service or commodity, whether offered for use or sold. Nor is the term "product" as used herein limited to any particular industry, commerce, or service. For example, the product may be a telecommunications product, a telemarketing product, an internet or web-based product, a financial or banking product, to name a few.

As used herein, a "telecommunications product" is not limited to a telecommunications device, but may comprise any commodity provided (e.g., offered or sold) by a telecommunications provider or network operator. For example, a telecommunications product may comprise a service plan or subscription such as a telecommunications voice service plan, or a telecommunications data service plan, or a plan which includes a combination of voice and data and/or other services such the example services described above. Moreover, a telecommunications product may also include one or more commodities that are described in other offerings of a telecommunications provider or network operator, such as purchasable deals for one or more services or features. Such deals may be characterized by time duration, time of the week or day, geographic location, nature of content (e.g., video), etc.

Each product instance typically has a product instance lifecycle. The product instance lifecycle is an expression or measure of how long the product instance can remain in existence before expiration of the product instance. Upon expiration of the product instance the payor account(s) associated with the product instance must again be charged by another usage of a service bundled with the product. In some situations the product instance lifecycle may be simply a function of time, e.g., of a time duration parameter. For example, the product instance lifecycle may be a certain number of hours, one day, one week, or some other chronological or calendar expression of time. Alternatively or additionally, the product instance lifecycle may be a function of availability of a product resource allocated to the product instance. In this regard, a product may have its own resources and the product may be considered as depleted if one of its resources is depleted. As examples, the product instance lifecycle may be expressed in terms of a maximum counter value, attributes, memory usage, number of sessions, etc., which may be utilized by the services associated with the product instance. For example, if one of the counters belonging to a service of the product instance reaches a maximum threshold value, attainment of such threshold may be used as an indicator to the charging logic that the product can no longer be used, in which case in order to satisfy the requested quota for the reported service, another product must be selected. In some example implementations, the product instance lifecycle may be expressed or measured both in terms of a time duration parameter and availability of a product resource. For example, the product instance lifecycle may extend to the first to occur of (1) a specified calendar hour/date, and (2) attainment of a predetermined resource utilization.

Typically the product consumer (e.g., a purchaser or recipient of the product 22) accesses the product 22 through a product utilization device. Accordingly, FIG. 1 shows product consumer 30 as using product utilization device 32 to gain access to product 22. The product consumer 30 may be human as in the case shown in FIG. 1, but also could be non-human equipment in the form, for example, of a computer or computer system or other automated consumer. In some cases the product utilization device 32 may be a telecommunications device such as a stationary (landline) or wireless terminal (e.g., cell phone, smart phone, UE, or mobile terminal, laptop with mobile termination).

Typically when looking at charging scenarios where a bundle or product is used, it is the product or bundle that the subscriber pays for. Purchase or acquisition of the product or bundle enables the subscriber to use a set of services, optionally with a service usage limit (e.g. volume limit). The services are typically not charged for, meaning that there is no rate (i.e. zero rate) connected to the service usage.

Figure 2:
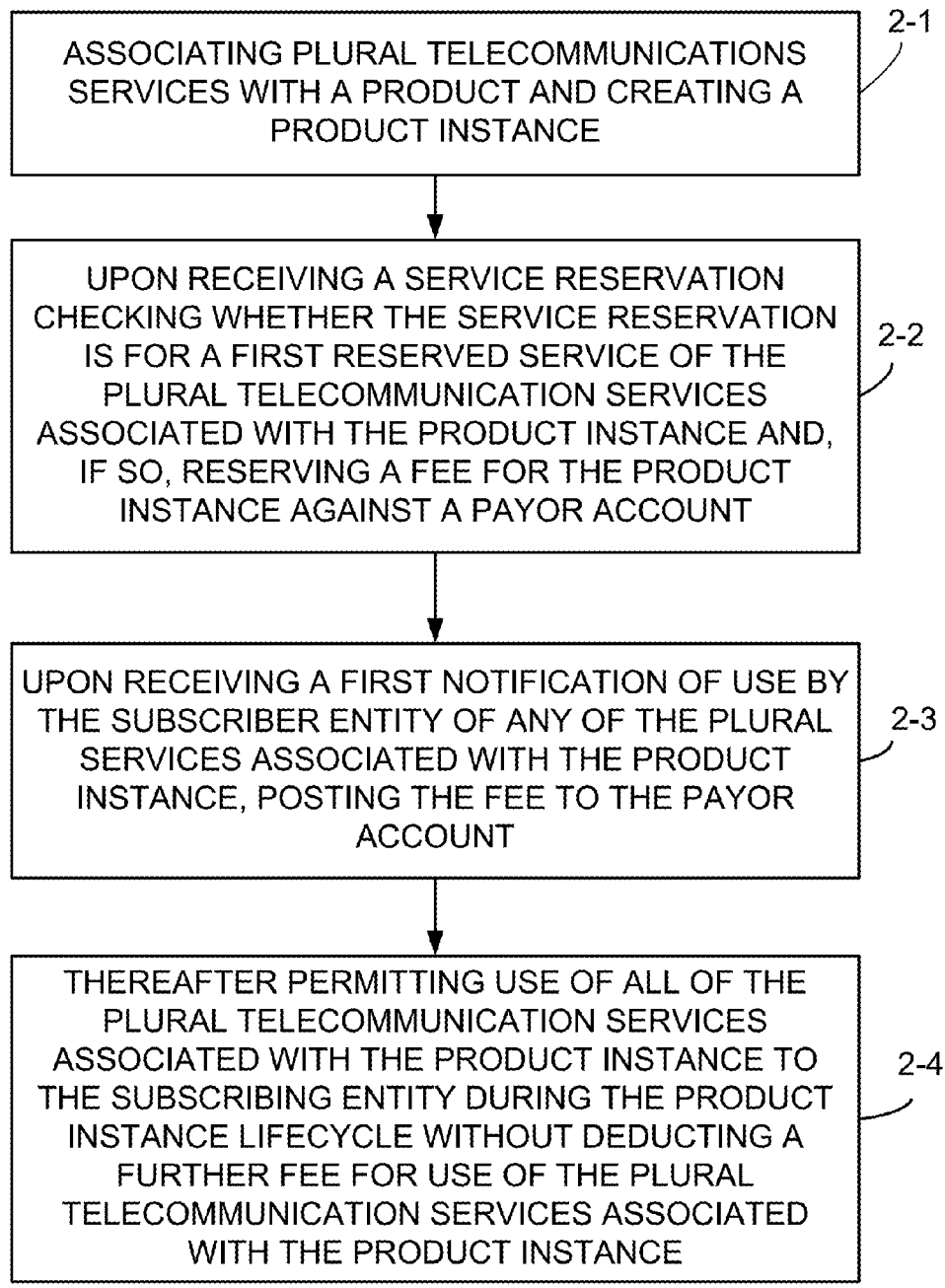
FIG. 2 is a flowchart depicting example acts or steps included in a basic, representative method of operating a charging system.

FIG. 2 shows example acts or steps included in a basic, representative method of operating the generic charging system 20 of FIG. 1. Act 2-1 comprises associating plural telecommunications services with a product and creating a product instance. Creating the product instance may involve, e.g., the subscriber entity purchasing, registering, or acquiring access to rights to the product. The product instance is available to a subscriber entity and has a product instance lifecycle. When the subscriber entity indicates a need to use a service associated with the product, a service registration occurs. Act 2-2 comprises, upon receiving a service reservation, the charging system 20 checking whether the service reservation is for a first reserved service of the plural telecommunication services associated with the product instance and, if so, reserving a fee for the product instance against a payor account. In other words, act 2-2 comprises reserving a product fee for the product instance against a payor account upon receipt of a first service reservation of a first reserved service of the plural telecommunication services associated with the product instance.

Act 2-3 comprises posting the product fee against the payor account in conjunction with use of one of the plural telecommunication services associated with the product instance. More specifically, in an example embodiment and mode act 2-3 comprises, upon receiving a first notification of use by the subscriber entity of any of the plural services associated with the product instance, posting the fee to the payor account.

Act 2-4 comprises thereafter permitting use of all of the plural telecommunication services associated with the product instance to the subscribing entity during the product instance lifecycle without deducting a further fee for use of the plural telecommunication services associated with the product instance.

Thus, in charging scenarios such as that of FIG. 2 wherein a bundle or product is used, it is the product or bundle that the subscriber pays for. Purchase or acquisition of the product or bundle enables the subscriber to use a set of services, optionally with a service usage limit (e.g. volume limit), for the product lifecycle. The services are typically not charged for, meaning that there is no rate (i.e. zero rate) connected to the service usage.

Figure 2A:
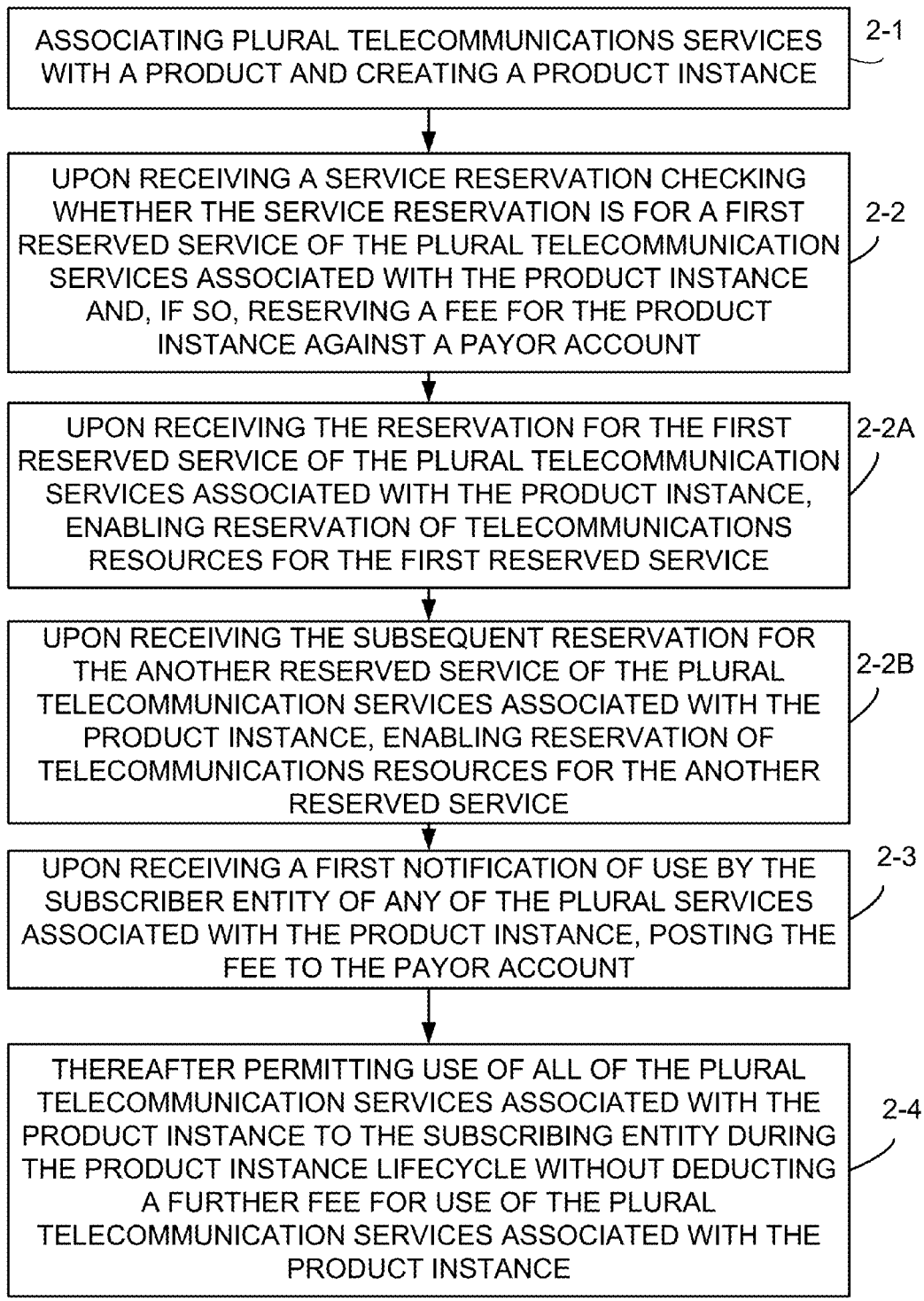
FIG. 2A is a flowchart depicting example acts or steps included in an example implementation of the method of FIG. 2.

In some example implementations the method may include further acts which pertain to reservation of telecommunications resources which are needed by the services of the product instance for which the fee reservation is made. For example, FIG. 2A shows additional acts 2-2A and 2-2B, which are executed in the context of other acts of FIG. 2. Act 2-2A comprises, upon receiving the reservation for the first reserved service of the plural telecommunication services associated with the product instance, enabling reservation of telecommunications resources for the first reserved service. Act 2-2B comprises, upon receiving the subsequent reservation for the another reserved service of the plural telecommunication services associated with the product instance, enabling reservation of telecommunications resources for the another reserved service. However, in view of the fee reservation of act 2-2, upon receiving such subsequent reservation for another reserved service of the plural telecommunication services associated with the product instance, no further fee is reserved for the product instance against the payor account.

FIG. 3 shows an example embodiment of charging system 20 in more detail, as well as an example context in which the charging system 20 operates when the product utilization device 32 is a wireless terminal. In particular, FIG. 3 shows that product utilization device 32 is connected by access network 36 to core network 38, and that from core network 38 the charging system 20 receives service requests. The access network 36 can be any suitable type of access network, a radio access network being just one example.

FIG. 3 further shows that the example charging system 20 comprises various constituent charging functionalities or units in addition to charging manager 28 and the accounts 26. Among the example functionalities shown are service handling unit/manager 40; product handling unit/manager 42; and account manager 44. In FIG. 3, the accounts 26 are also shown/known as account database 26, which is operated on by account (database) manager 44.

Core network 38 detects and monitors activity and/or traffic in the core network, analyzes the activity and/or traffic, and when appropriate sends charging request messages towards the service handling manager 40. Thus the core network 38 may comprise certain charging clients which send the charging request messages to service handling manager 40 over appropriate charging interfaces. For example, for data services an appropriate interface is the Gy interface which is described, for example, in [1] 3GPP TS 32.299 V11.6.0 (2012-12), 3rd Generation Partnership Project; Technical Specification Group Services and System Aspects; Telecommunication management; Charging management; Diameter charging applications (Release 11); and [2] 3GPP TS 32.251 V12.0.0 (2012-12); 3rd Generation Partnership Project; Technical Specification Group Services and System Aspects;

Telecommunication Management; Charging Management; Packet Switched Domain Charging (Release 12). For voice services an appropriate interface is the Customized Applications For Mobile Enhanced Logic (Camel) interface.

The charging request messages may be concerned with a reservation of a service or (as in the case of an update message) actual usage of a service (in which case the message may include Used Service Units (USU)). The service handling manager 40 essentially receives and routes information associated with the charging request messages to other units of charging system 20 so that charging system 20 may make reservations and/or rate or determine a fee for the involved service if the product is indeed available for the subscriber. The service handling manager 40 may also send acknowledgement or other appropriate messages back to the charging clients.

The product handling manager 42, also known as the "product handler", is configured to associate plural telecommunications services with a product and to generate a product instance for a subscriber entity. As mentioned above, the product instance is available to the subscriber entity and comprises a product instance lifecycle. The account manager 44 handles a payor account associated with the product instance. The charging manager 28, also known as charging controller 28, perform various actions during the product instance lifecycle. For example, as act 2-2 the charging controller 28 checks, upon receiving a service reservation, whether the service reservation is for a first reserved service of the plural telecommunication services associated with the product instance. If so, the charging controller reserves a fee for the product instance against the payor account. The charging controller thereafter posts the product fee to the payor account upon receiving a first notification of use by the subscriber entity of any of the plural services associated with the product instance (act 2-3). The charging controller thereafter permits use of all of the plural telecommunication services associated with the product instance to the subscribing entity during the product instance lifecycle without posting a further fee for use of the plural telecommunication services associated with the product instance (act 2-4).

It will be appreciated that the charging system 20 may comprise other units and/or functionalities, as well as other charging activities, such as those illustrated in U.S. patent application Ser. No. 13/464,397, entitled "PRODUCT-CENTRIC CHARGING SYSTEM AND METHOD", and U.S. patent application Ser. No. 13/538,340, entitled "TELECOMMUNICATIONS CHARGING WITH EXTERNALLY-CONTROLLED ACCOUNT SELECTION", both of which are incorporated herein by reference. Such other units, functionalities, and/or charging activities may include without limitation a product specification database and a product offering database, for example. When a product is purchased or acquired through acceptance or purchase of a product offering, the charging system 20 may create an instance of the product in product handling manager 42. The instance of the product may refer, for example, to a record in a product offering database, which in turn may refer to a corresponding specification for that product.

In an example embodiment and as depicted by way of example in FIG. 1 and FIG. 3, the charging system 20 and particularly charging manager 28 may be realized by a machine platform. To this end FIG. 1 and FIG. 3 employ a broken line to represent machine platform 50 which comprises charging system 20(4). The terminology "machine platform" is a way of describing how the functional units of charging system 20 can be implemented or realized by machine. The machine platform 50 can take any of several forms, such as (for example) logic processing circuitry such as, but not limited to, electronic circuitry in the form of a computer implementation platform or a hardware circuit platform.

Moreover, the functionalities of the charging system 20 including the functionalities of charging controller/manager 28 may be implemented by a computer program product stored on non-transient media which, when executed by a processor, executes or performs actions including those described herein, including but not limited to the actions of FIG. 2.

Figure 4:
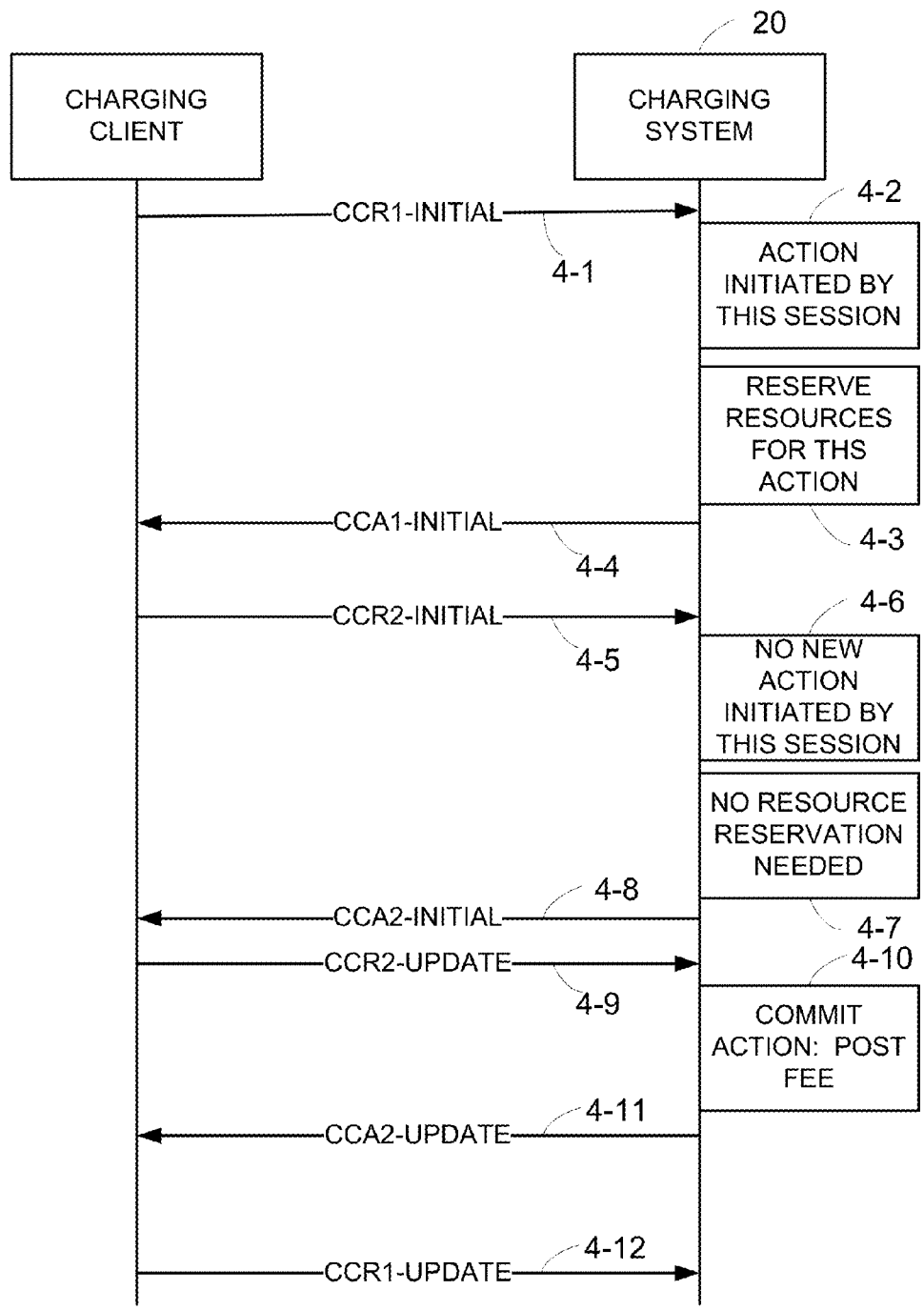
FIG. 4 is a diagrammatic view of message flow according to an example embodiment and mode.

FIG. 4 illustrates an example scenario in which a fee is to be charged for a product (e.g., Product1) in which services X, Y & Z are included. As understood from the foregoing, the fee will be posted or charged only once when the product (any of the included services) is used for the first time during the product instance lifecycle. After the product fee is posted or charged, the product (all the included services) can be used during the product instance lifecycle without a further fee being posted, e.g., charged. FIG. 4 also serves as an example of common data modification by parallel sessions.

FIG. 4 and other embodiments described herein illustrate charging messages as being communicated between a charging client entity, e.g., "charging client", and the charging system 20. Although one block is shown as being in communication with the charging system 20, it should be understood that there may be plural different charging client entities that are sending charging messages to charging system 20. For example, when a charging message for service X is referenced, such charging message may occur over a first interface from a first charging client, and when a charging message for service Y is referenced, such charging message may occur over a second interface from a second charging client, and so on.

In real-time session-based charging, when the subscriber starts a data session for service X, a charging client entity (e.g., Credit Control Client [CC-Client]) sends a credit control request message [CCR Initial (CCR-1)] to the online charging system (OCS) 20, as reflected by act 4-1 of FIG. 4. As act 4-2 the charging system 20 determines that an action has been initiated by the session for service X. Such action of act 4-2 may take the form of setting a fee-reserved status indicator for Product1 to a value such as 1 (which indicates that a fee has already been reserved). As act 4-3, charging system 20 reserves resources for this action, e.g., reserves both the fee for Product1 and the requested units (e.g., the requested service units [RSU]). As act 4-4 a credit control acknowledgement message [CCA Initial (CCA-1)] is sent by the charging system 20 to the charging client.

When the subscriber initiates another session for service Y as reflected by act 4-5 and the message CCR2-INITIAL, no fee will be reserved for the service session since service Y belongs to Product1 and a fee has already been reserved for Product1 (as act 4-3). Thus, symbol 4-5 indicates that no new action is initiated by this session, e.g., the charging system 20 need not set the fee-reserved status indicator for Product1. Symbol 4-6 of FIG. 4 reflects the fact that no new fee is reserved for the product by the session for service Y, although charging system 20 will reserves the requested service units (RSU) for the session of service Y. As act 4-8 the charging system 20 sends an acknowledgment message (CCA2-INITIAL) with an indication of the granted service units (GSU) to the CC-Client.

When charging system 20 receives a CCR Update message with used service units (USU) from a service session of any service that belongs to Product1, the reserved fee will be posted, e.g., deducted. In the example scenario of FIG. 4, the charging system 20 receives message CCR-2 UPDATE from service Y as act 4-9. As act 4-10 the used service units (USU) and the reserved fee for Product1 will be posted to the payor account in the account database 26 by account data base manager 44, even though the fee reservation is triggered by service session X. As used herein, "commit action" includes posting or charging the fee for the product, e.g., deducting the fee from the payor account. As act 4-11 the charging system 20 sends an acknowledgment message CCA2-UPDATE to the charging client. After the fee is posted, Product1 (all the included services of Product1) is free for use without any fee for the rest of the product lifecycle, e.g., day. Therefore, when (still within the product instance lifecycle) the charging system 20 receives a message such as CCR-1 UPDATE from service X as illustrated by act 4-12, no further fee for the product is posted with the payor account. While no further fee is deducted for use of Product1 during the lifecycle, the user service units (USU) are still be deducted.

The embodiment and mode of FIG. 4 essentially assumed that Product1 was available to or used only by a sole subscriber unit. The example embodiment and mode of FIG. 5, on the other hand, shows basic example acts or steps involved in an example scenario which concerns a fee for a shared product, e.g., a product shared by plural subscriber entities. In the FIG. 5 scenario, a fee is to be charged for a product (Product2) which has services X and Y. Product2 is shared by plural different subscribers, e.g., three subscribers such as subscriber $S_1$, subscriber $S_2$, and subscriber $S_3$. In the FIG. 5 scenario the product fee will be charged only once when Product2 is used for the first time during its product instance lifecycle. For sake of example, the product instance lifecycle for Product2 is one day. After that the initial charging for the lifecycle, Product2 (all the included services) can be used without being charged during the product instance lifecycle.

In real-time session-based charging, when a user (subscriber $S_1$) starts a data session for service X, as act 5-1 the CC-Client will send a credit control request message (e.g., CCR-1x) to charging system 20. The credit control request message carries, e.g, a number of requested service units (RSUs). As act 5-2 the charging system 20 checks and determines that service X belongs to Product2 and that subscriber $S_1$ is included as in subscribing entity for Product2. Then, as act 5-3, charging system 20: (1) reserves a fee for Product2; (2) sets a fee-reserved status indicator for Product2 to "active", i.e., to "1" (to indicated that the fee has been reserved); and (3) rates service X and for the session and reserves the requested service units (RSU). As act 5-4 the charging system 20 sends a credit control acknowledgment message [CCA-1x] to the charging client, which bears both the number of granted service units (GSU) and the validity time.

Act 5-5 involves the charging system 20 receiving a credit control request message [CCR-2y] for service Y (which belongs to Product2) from another user (subscriber $S_2$). The message CCR-2y bears a number of requested service units (RSU) for service Y. As act 5-6 the charging system 20 checks and determines that service Y belongs to Product2. The charging system 20 also checks the fee-reserved status indicator for Product2 and determines that it has already (at act 5-3) been set to "active", i.e., to "1", thereby indicating that the fee has been reserved. As reflected by symbol 5-7, no fee is reserved for Product2 since (at act 5-3) a fee has already been reserved for Product2 by service session X (from subscriber $S_1$). As part of act 5-7 charging system 20 only reserves the requested service units (RSU) and, as act 5-8, sends a credit control acknowledgment message [CCA-2y] with the granted service units (GSU) and the validity time to the charging client, e.g., CC-Client.

Act 5-9 shows charging system 20 receiving a report of usage of service Y by subscriber $S_2$, e.g., a credit control request message [CCR-Uy] reporting requested service units (RSU) and used service units (USU). As act 5-10 the charging system 20 posts or charges the package fee to the payor account, e.g., deducts the amount attributable to use of Product2 for the product instance lifecycle (e.g., for one day in the example under discussion). Thus, when charging system 20 receives a CCR Update with a report of used service units (USUs) from a service session of any service that belongs to Product2, for any of the subscribers that belong to the subscribing entity for Product2 (e.g., subscriber S1, S2, or S3), the reserved fee will be posted to the payor account in account database 20 by database account manager 44.

Figure 5:
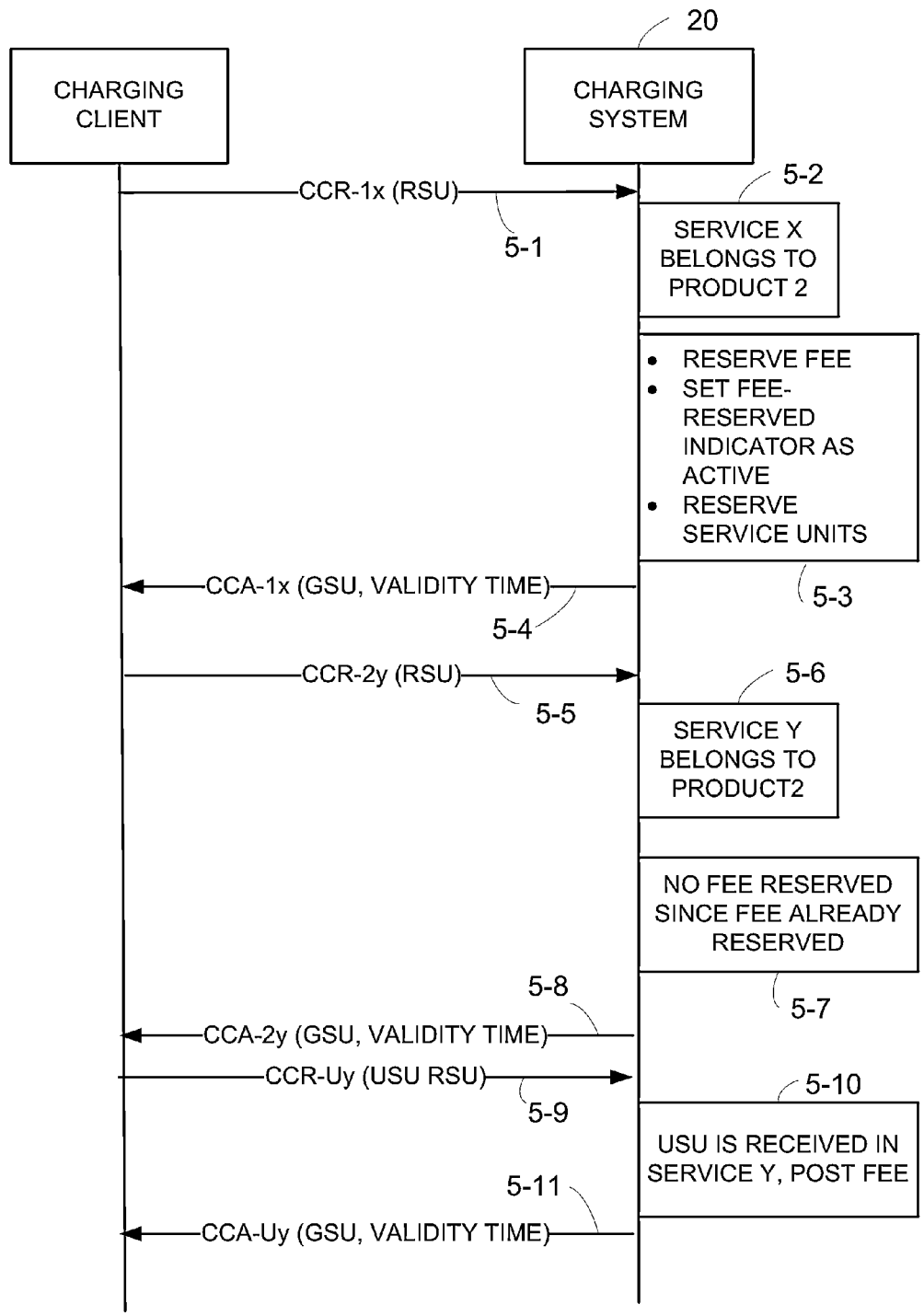
FIG. 5 is a diagrammatic view of message flow according to an example embodiment and mode wherein a subscriber entity comprises plural subscribers or users.

Thus, in the FIG. 5 scenario, the service session may be initiated by any subscriber who shares the same product. The subscriber whose service session triggers the deduction does not necessarily have to be the same subscriber who initiated the reservation, as long as the services in use belong to the same shared product.

In the FIG. 5 scenario, charging system 20 receives a CCR Update (CCR-Uy) with an indication of used service units (USUs) from service session Y, initiated by subscriber $S_2$. The used service units and the reserved fee for Product2 will be deducted (as shown by the "commit action" of act 5-10), even though the fee reservation was triggered by service session X (from subscriber $S_1$). An acknowledgement is sent as act 5-11. After the fee deduction, Product2 (all the included services) is free for use without any fee for the product instance lifecycle by all subscribers who share the product. The used service units (USUs) for each service will still be deducted during the product instance lifecycle.

The FIG. 5 scenario thus illustrates that the subscriber entity may comprise plural subscribers. In other words, a group of subscribers (e.g., family, office, or other affinity group or group of persons or entities covered by a subscriber plan) may have access to the product.

Moreover, it should be understood the payor account need not be one particular account. In an example embodiment the posting may occur according to either predetermined or dynamic logic to a selected account of a pool of eligible accounts, as taught (for example) in U.S. patent application Ser. No. 13/464,397, entitled "PRODUCT-CENTRIC CHARGING SYSTEM AND METHOD".

Figure 6:
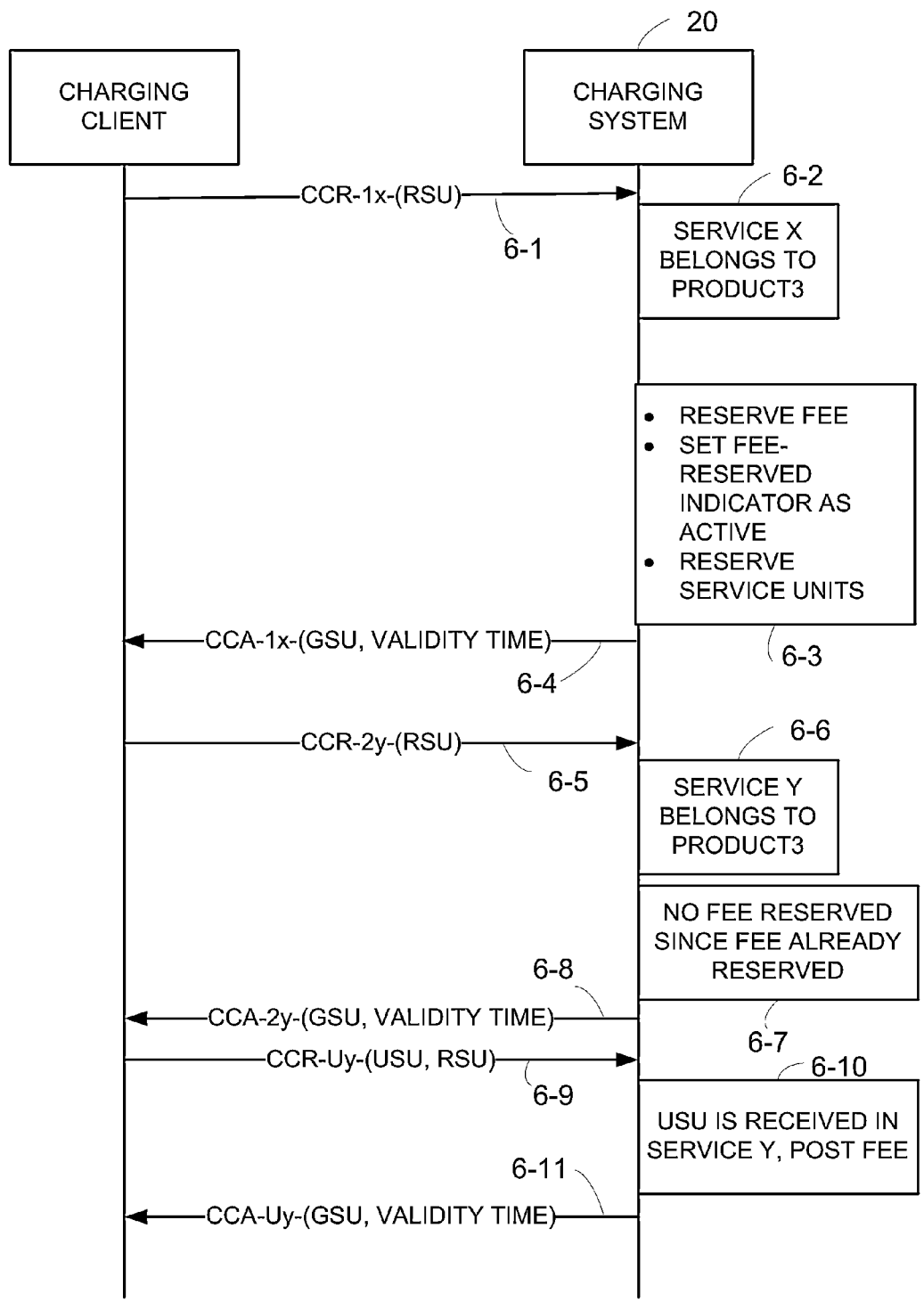
FIG. 6 is a diagrammatic view of message flow according to a more detailed example embodiment and mode.

FIG. 6 shows an example scenario involving posting of fee for a product, e.g., Product3. In FIG. 6 a Credit Control (CC) Client receives a Gy session establishment request for service X and, as act 6-1, sends an initial Credit Control Request (CCR-1x) with a number of requested service units (RSUs) to charging system 20. The Gy interface is an on-line charging interface between the Gateway GPRS support node (GGSN) and the online charging system (OCS), and may use the diameter protocol.

As act 6-2 the charging system 20 checks the rating group/service identifier of service X to see if the user has the service in his/her subscription. Service X belongs to Product3 to which the user has subscribed. A fee is required to use Product3 for product instance lifecycle (which may be, for example, a day (e.g., until midnight)).

As act 6-3 charging system 20 checks the payor account balance and (1) reserves a fee for Product3; (2) sets a fee-reserved status indicator for Product3 to "active", i.e., to "1" (to indicated that the fee has been reserved); and (3) rates service X and for the session and reserves the requested service units (RSU) for the session. Then, as act 6-4, a message CCA-1x which includes a number of granted service units (GSU) and validity time is sent to the CC Client.

As act 6-5 the CC Client receives a new Gy session establishment request for service Y and sends a message CCR-1y with a number of requested service units (RSUs) to charging system 20. As act 6-6 the charging system 20 checks the rating group/service identifier of service Y to see if the user has the service in his/her subscription. Service Y belongs to Product3 as well, so the fee-reserved status indicator for Product3 is checked. In the check of act 6-6 it is determined that the fee-reserved status indicator for Product3 has the value (1) which indicates that a fee is already reserved for Product3, so (as reflected by act 6-7) no fee needs to be reserved. The service is rated and, as part of act 6-7, service units are reserved for the session. Then, as act 6-8, a message CCA-Uy which includes a number of granted service units (GSU) together with validity time is sent to the CC Client.

As act 6-9 the charging system 20 receives the message CCR-Uy for service session Y with an indication of used service units (USUs) and requested service units (RSUs). The message CCR-Uy reflects the fact that used service units (USUs) have accrued for service session Y. Since service Y is part of Product3 and fee-reserved status indicator is set to 1 for Product3, as act 6-10 the product fee is posted (e.g., charged or deducted). Moreover, the fee-reserved status indicator is set to "2" to indicated that the fee has been posted. The used service units (USUs) are posted/deducted as well. As act 6-11, a new number of granted service units (GSUs) is calculated, reserved, and sent in message CCA-Uy to the CC Client.

In the above scenario of FIG. 6, the fee-reserved status indicator needs to be reset (=0) at the expiration of the product instance lifecycle (e.g., at midnight in the example scenario since the fee is applied everyday).

Thus, in accordance with an aspect of the technology disclosed herein, when there is common data shared by several parallel sessions/activities, if a session/activity has initiated an action to modify the data, the desired behavior is that the same action will not be initiated again. The common data should be modified once and be shared by all the parallel sessions/activities. For example, in example embodiments and modes described above a fee-reserved status indicator is accessible by charging system 20 with respect to sessions of, e.g., different services included in a product and is either set or unset to indicate whether or not a fee reservation has been made with respect to the product.

For parallel charging sessions/activities in the Online Charging System (OCS), when a session/activity has initiated an action, subsequent sessions/activities will not initiate the same action again but have a reference or indicator to the already initiated action instead. This will ensure that the common data is modified only once, which is the desired behavior. It will also prevent resources from being tied up by unnecessary actions. Thus, in example embodiments and modes described, a fee is reserved only once by virtue of checking of the fee-reserved status indicator which indicates that a fee has already been reserved for a service associated with the product.

When a session/activity fulfills the conditions for committing the action, it will perform the update (see FIG. 4). The session/activity that performs the update is not necessarily the one that initiated the action, but the one that fulfills the update conditions first.

A subscriber may sign up for a product in various ways, such as, e.g., via a web portal. Typically the product includes a certain amount of volume to be used and may be used for a limited time (e.g., product instance lifecycle, as described above). As explained above, the subscriber will be charged for the product when it is used for the first time. The fee will be deducted from the subscriber's accounts in SDP. For example, the product may specify that 100 Mb is available for a 3 hour duration at the cost of 30 Swedish Krona (SEK). Alternatively, for a "daily access" case example, the subscriber may be charged X amount of money each day if the subscriber uses his/her data access service. If the service is not used, no fee will be charged. The Daily Access Fee may be a default rating for all subscribers who have GPRS service and are not subscribed to any other bucket, for example. It is a traffic triggered bucket, once the subscriber initiates a data session, the bucket is assigned automatically. This is versus other buckets where the subscriber has to opt in to the bucket to be able to use it. For example, a subscriber may pay 1 SEK and get 5 MBs quota. After finishing the quota (5 MB), the subscriber is rated in a flat 0.25 SEK per 1 MB. The Bucket may expire at midnight 00:00.

As mentioned above, a subscriber signs up or otherwise subscribes to a product, e.g., a "bundle". A fee will be posted (e.g., deducted) when the bundle is used.

Figure 7:
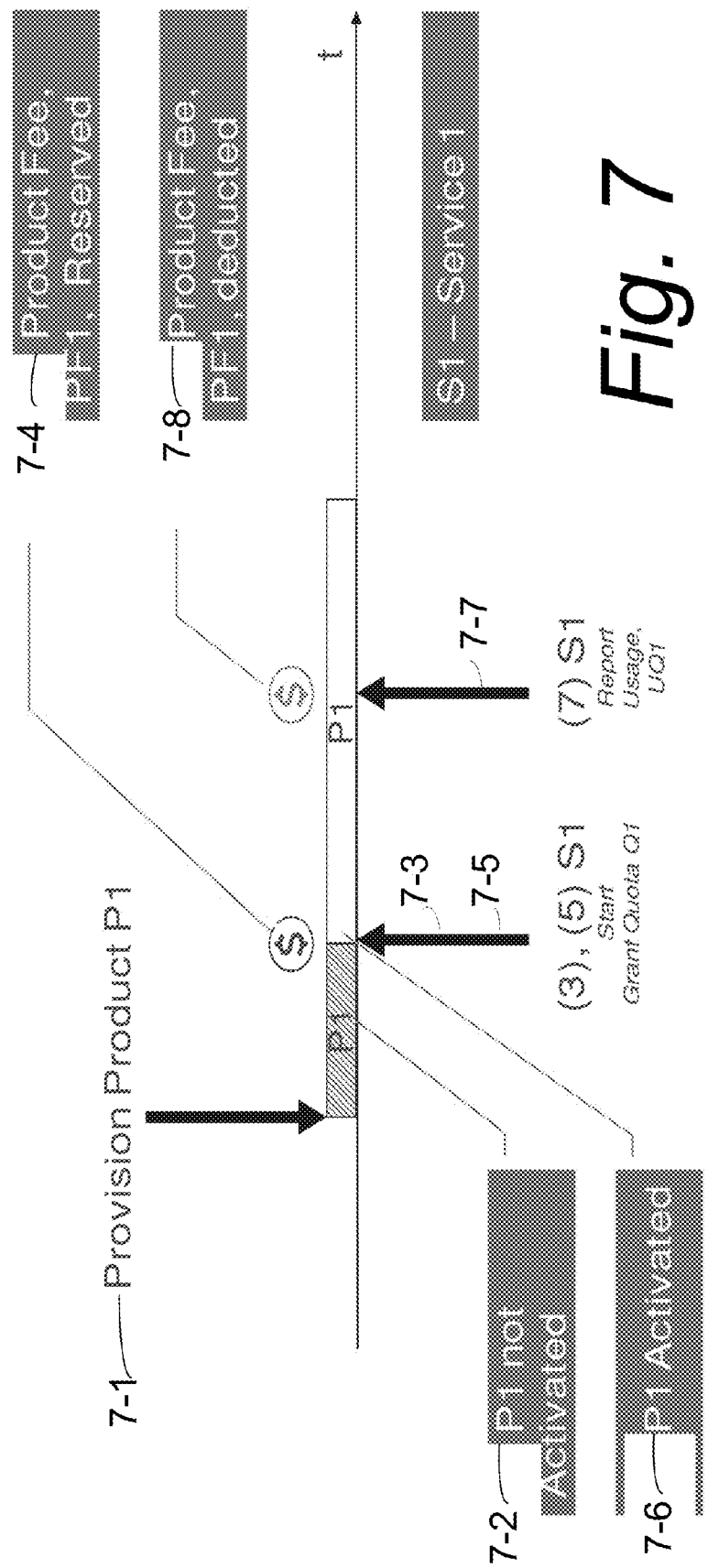
FIG. 7, FIG. 8, and FIG. 9 are diagrammatic views of differing example scenarios of charging using aspects of the technology disclosed herein.

FIG. 7 shows an example scenario of charging using aspects of the technology disclosed herein. As act 7-(1), the subscriber signs up for a product, P1, of a product offering. An entity representing the product is provisioned to the subscriber database. As act 7-(2) the state of the product is set to 'not active', which indicates that the subscriber has not started to use the product. As act 7-(3) the subscriber starts to use service, S1. Product P1 is used for handling charging and policy for the service. As act 7-(4) a Product Fee, PF1, is reserved for P1. The reservation is done on the Subscriber's accounts in the subscriber database. Since the subscriber had enough funds available for covering Product Fee PF1, as act 7-(5) Quota Q1 is granted for Service S1. As act 7-(6) the Product P1 is activated. As act 7-(7) the quota that the subscriber has used for Service S1 is reported. As act 7-(8) the handling of the used quota UQ1 triggers the deduction of the product fee, PF1, for P1.

Figure 8:
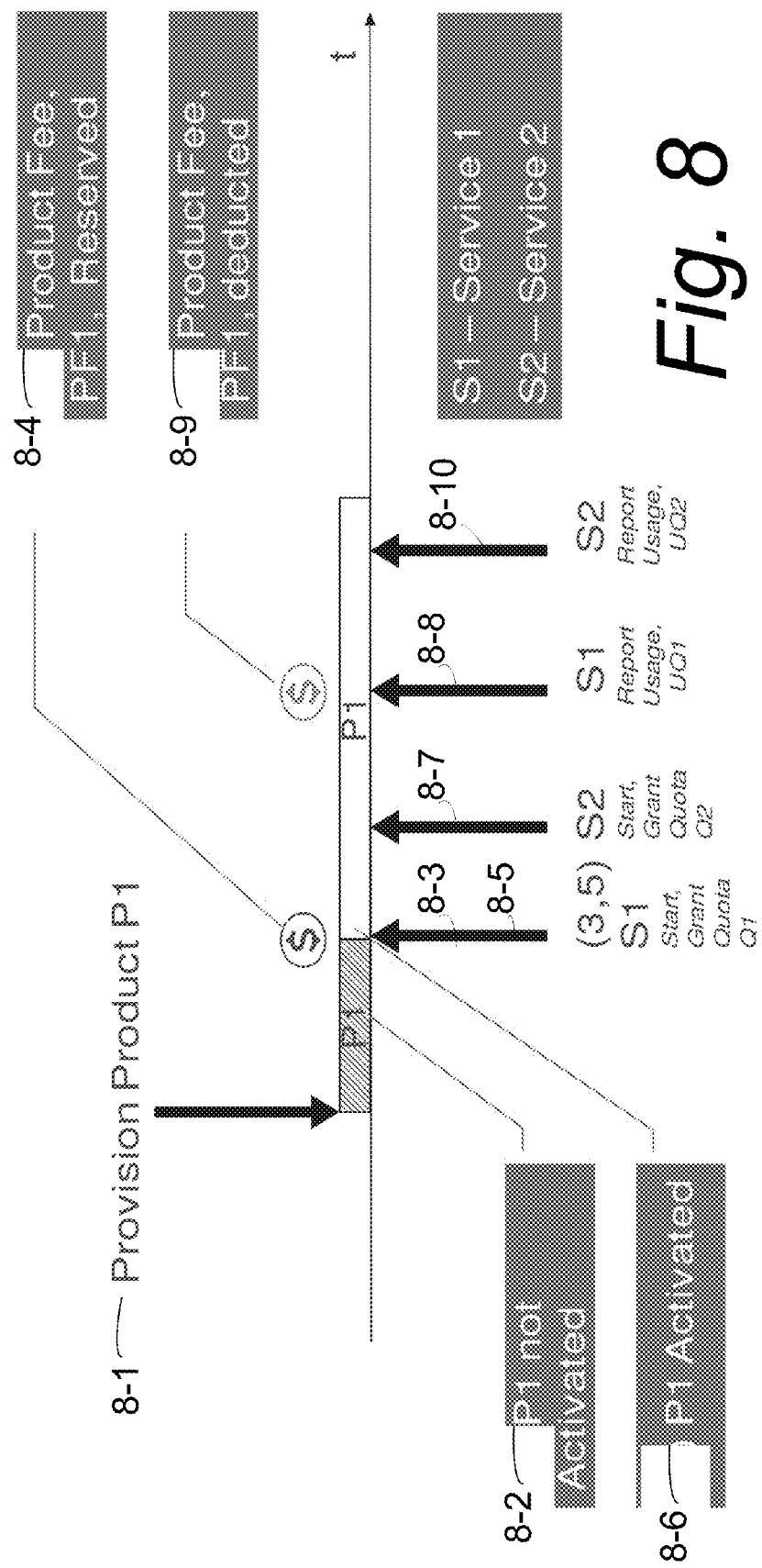
Figure 9:
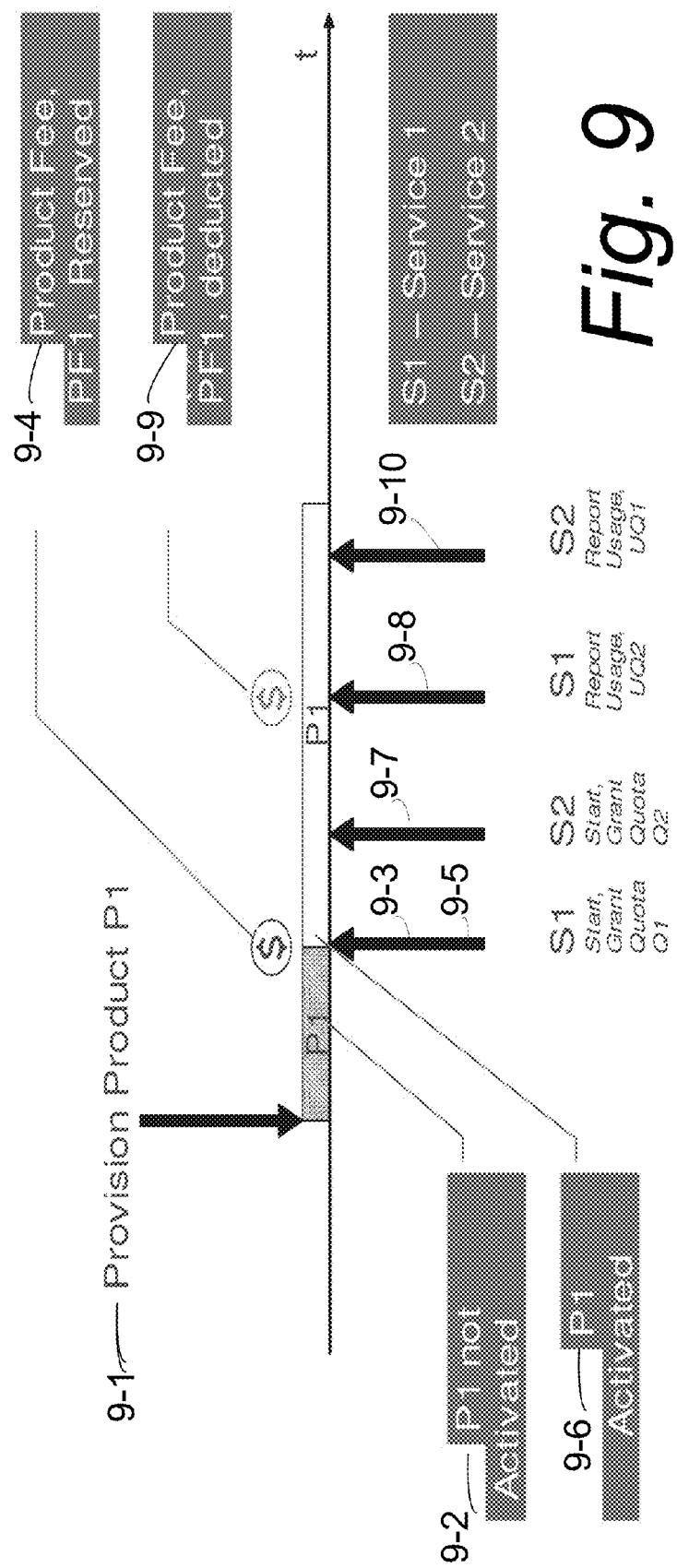

FIG. 8 and FIG. 9 show other example scenarios of charging using aspects of the technology disclosed herein. In the scenario of FIG. 8, act 8-1 reflects a Subscriber signing up for a product, P1, of a product offering. An entity representing the product is provisioned to the account database 26. When the product is provisioned to the subscriber, it is stored in the account database 26. As act 8-2 the state of the product is set to 'not active', which indicates that the subscriber has not started to use the product. Act 8-3 reflects the subscriber starting to use service S1. Product P1 is used for handling charging and policy for the service S1. Act 8-4 shows a Product Fee, PF1, being reserved for product P1. The reservation is done on the subscriber's accounts in the account database 26. Since the subscriber had enough funds available for covering Product Fee PF1, a Quota Q1 is granted for Service S1 as act 8-5. Act 8-6 comprises the product P1 being activated.

Continuing with the scenario of FIG. 8, as act 8-7 the subscriber starts to use Service S2. Product P1 is also used in the charging authorization evaluation for Service S2. Since there is already a Product Fee, PF1, reserved for Product P1, no new Product Fee is reserved for use of service S2.

Act 8-8 of FIG. 8 reflects that the quota (UQ1) that the subscriber has used for Service S1 is reported. The handling of the used quota UQ1 triggers the deduction of the product fee, PF1, for product P1, as shown by act 8-9. Later, as act 8-10, the used quota, UQ2, that the subscriber has used for Service S2, is reported. Since the Product Fee, PF1, for Product P1 has already been deducted, the Product P1 is now marked as "Fee is applied for product" and no additional Product Fee has to be evaluated for product P1.

The scenario of FIG. 9 resembles the scenario of FIG. 8, except that what was shown as act 8-8 in FIG. 8 becomes act 9-10 in FIG. 9 and what was shown as act 8-10 in FIG. 8 becomes act 9-8 in FIG. 9. FIG. 8 and FIG. 9 thus show that it does not matter in which order the used quota is reported in a parallel service charging scenario: when the product P1 is used in the process of determining the actual cost for what the subscriber has used, this will trigger the deduction of the Product Fee PF1. FIG. 8 and FIG. 9 thus emphasize that it is the first reported usage for a service in reference to the product that will trigger the product fee deduction.

Figure 10:
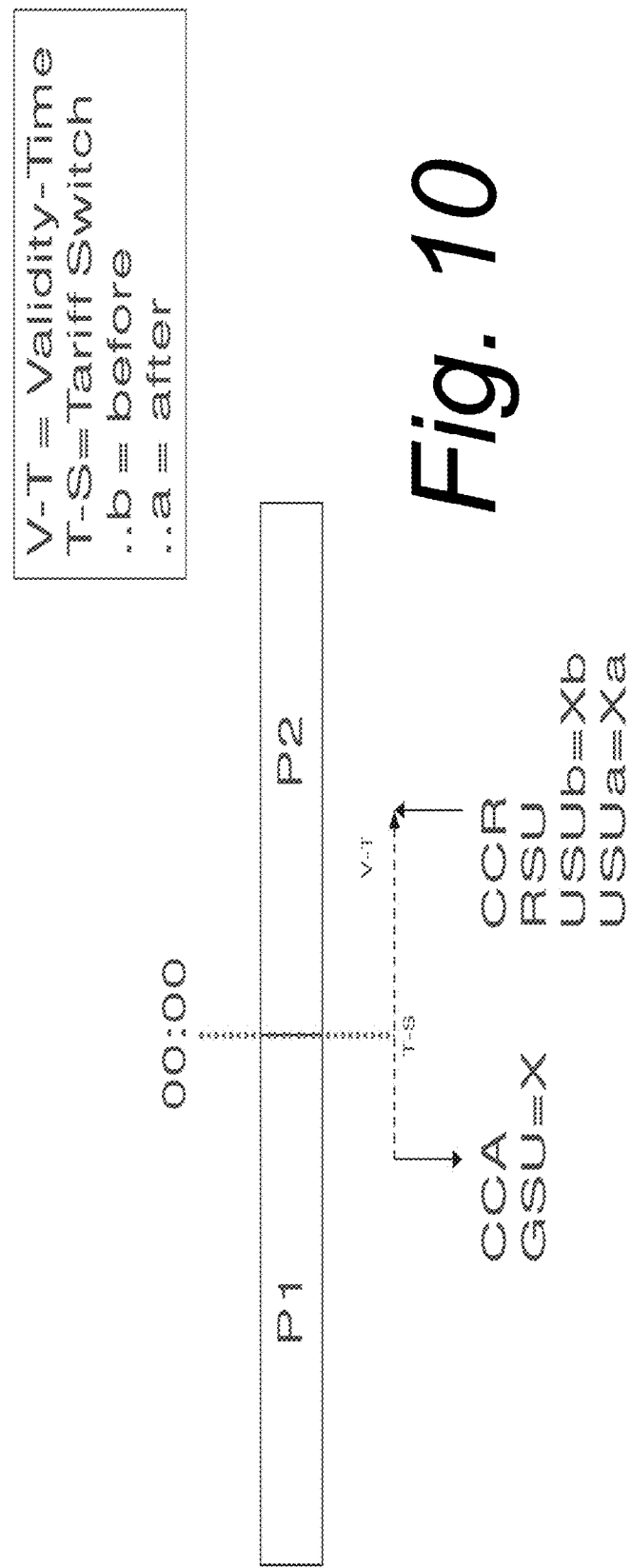
FIG. 10 and FIG. 11 are diagrammatic views illustrating various aspects of product fee determination at product transition.

FIG. 10 and FIG. 1 illustrate various aspects of product fee determination at product transition. Product transition may be needed when a requested service belonging to a first product (e.g., product P1) requires a number of service units that may extend beyond a product instance lifecycle of the first product, and thus trigger involvement of a successor or second product (e.g., product P2). If it turns out that the service actually has to involve the successor or second product (e.g., product P2), then the product fee for the first product (product P1) will not entirely cover the service and thus a product fee for the successor or second product (e.g., product P2) must be deducted.

FIG. 10 illustrates product fee determination at product transition in a scenario in which funds are available for the product fee, e.g., funds are available for the product fee for product P2. In the FIG. 10 scenario product P1 is valid until midnight and product P2 is valid after midnight. The subscriber begins by using a service before midnight. In conjunction with the pre-midnight service the charging authorization evaluation process determines both the amount of quota to grant, X, and the validity time for that quota. In this process product P2 is used as a part of the decision. In order to use product P2, a product fee is reserved and funds for that product fee must be available to the subscriber. Funds are available and a product fee is reserved for product P2. At an appropriate time a product fee is deducted for Product P1. When the usage is reported for the service, it is reported in two parts: (1) the quota Xa that was used before midnight, and (2) the quota Xb that was used after midnight. Then the product fee for product P2 is deducted. If no quota was used after midnight, then the reserved product fee for P2 is cancelled and no product fee is deducted for P2.

Figure 11:
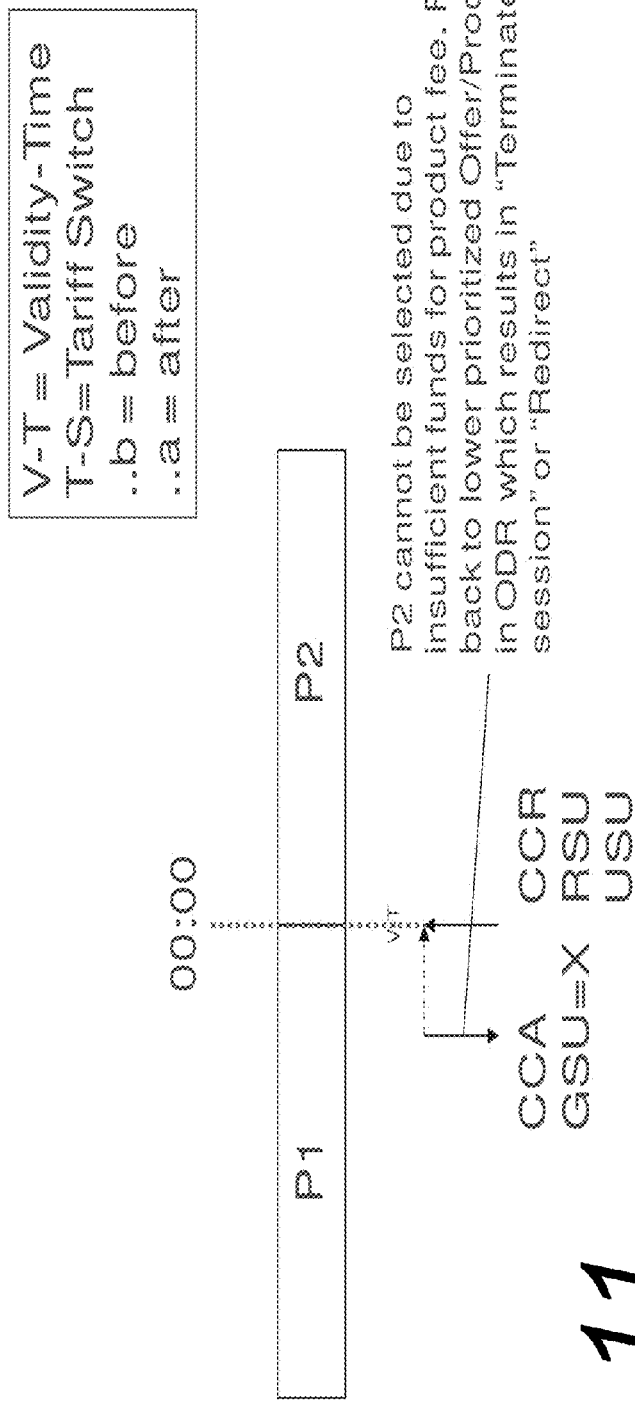

FIG. 11 illustrates product fee determination at product transition in a scenario in which funds are not available for the product fee, e.g., funds are not available for the product fee for product P2. In the scenario of FIG. 11, product P2 cannot be selected due to insufficient funds for product fee. So in such scenario the rating logic must select a different product that will be used in the credit authorization evaluation of service that is requested. The selected product credit authorization rules can result in, for example, the subscriber being redirected to a top up web page instead of being allowed to use the requested service.

From the foregoing it is seen that a fee is reserved for the product when the product is used for the first time as a part of the charging authorization analysis when granting a quota that can be used for a service. This can occur either at start of a session or during the continuation of a session (intermediate).

```
CCR Initial --->
<--CCA
<Product 'P1' get provisioned to the subscriber>
```

CCR Update-->The service is to be continued to be used; the session will continue. As a part of the analysis for determining the quota to grant, product P1 is selected and included as a part of that analysis. This will trigger the fee reservation for P1. If there are not enough funds for covering the whole fee, P1 cannot be used and is thus excluded from the analysis input.

Example Advantages

By having a reference to an already initiated action instead of initiating the same action again has various advantages, two of which are listed below:
 The users' resources will not be tied up by the repeated actions initiated by the parallel sessions/activities.
 Any session/activity that fulfills the update conditions first can commit the action. In this way, the system does not have to wait for the initiating session for the update. The users' resources that are tied up to the action will be freed up earlier. Resource usage in the OCS will also be reduced.

Example Abbreviations

The following example abbreviations may be employed herein or otherwise in the technology disclosed herein:
CCA Credit Control Answer
CC-Client Credit Control Client
CCR Credit Control Request
GSU Granted Service Units
OCS Online Charging System
USU Used Service Units Example Embodiments The following provide brief, non-exhaustive descriptions of some of the example embodiments and modes describe herein or otherwise encompassed hereby:

Example Embodiment M1

A method in a node of a telecommunications charging system comprising:
 associating plural telecommunications services with a product and creating a product instance, the product instance being available to a subscriber entity and having a product instance lifecycle;
 upon receiving a service reservation, checking whether the service reservation is for a first reserved service of the plural telecommunication services associated with the product instance and, if so, reserving a fee for the product instance against a payor account;
 upon receiving a first notification of use by the subscriber entity of any of the plural services associated with the product instance, posting the fee to the payor account; and thereafter permitting use of all of the plural telecommunication services associated with the product instance to the subscribing entity during the product instance lifecycle without posting a further fee for use of the plural telecommunication services associated with the product instance

Example Embodiment M1.1

The method of Example Embodiment M1, wherein the subscriber entity comprises plural users.

Example Embodiment M1.2

The method of Example Embodiment M1, further comprising, upon receiving a subsequent reservation for another reserved service of the plural telecommunication services associated with the product instance, not reserving a further fee for the product instance against the payor account.

Example Embodiment M1.2.1

The method of Example Embodiment M1.2, further comprising:
upon receiving the reservation for the first reserved service of the plural telecommunication services associated with the product instance, enabling reservation of telecommunications resources for the first reserved service;
upon receiving the subsequent reservation for the another reserved service of the plural telecommunication services associated with the product instance, enabling reservation of telecommunications resources for the another reserved service.

Example Embodiment M1.3

The method of Example Embodiment M1, wherein product instance lifecycle is a function of at least one of a time duration parameter and availability of a product resource allocated to the product instance.

Example Embodiment N1

A charging node for telecommunications system wherein plural telecommunications services are associated with a product, the charging node comprising a charging controller configured, during the product instance lifecycle:
to check, upon receiving a service reservation, whether the service reservation is for a first reserved service of the plural telecommunication services associated with a product instance of the product for a subscriber entity and, if so, to reserve a fee for the product instance against a payor account associated with the product instance;
to post the product fee to the payor account upon receiving a first notification of use by the subscriber entity of any of the plural services associated with the product instance; and thereafter,
to permit use of all of the plural telecommunication services associated with the product instance to the subscribing entity during a product instance lifecycle without posting a further fee for use of the plural telecommunication services associated with the product instance.

Example Embodiment N1.1

The node of Example Embodiment N1, wherein the charging controller is configured to make no further product fee reservation upon receiving a subsequent reservation for another reserved service of the plural telecommunication services associated with the product instance of the product.

Example Embodiment N1.2

The node of Example Embodiment N1, further comprising:
a product handler configured to associate the plural telecommunications services with the product and to generate the product instance for the subscriber entity, the product instance being available to the subscriber entity and having the product instance lifecycle;
an account manager configured to handle the payor account associated with the product instance;
a service manager configured to receive the service reservations and at least one usage notification for the plural telecommunications services associated with the product instance.

Example Embodiment N1.3

The node of Example Embodiment N1, wherein:
the product handler is configured to maintain in memory both product fee reservation information and product fee posting information for the instance of the product;
the account manager is further configured to post the product fee to the payor account when the product fee posting information comprises a product fee posting indicator;
the charging controller is further configured:
to store a product fee reservation indicator in the product fee reservation information only upon receiving a service reservation for a first reserved service of the plural telecommunication services associated with the instance of the product;
upon receiving a subsequent reservation for another reserved service of the plural telecommunication services associated with the instance of the product, to ascertain existence of the product fee reservation indicator and make no further fee reservation;
to store the product fee posting indicator in the product fee posting information only upon receiving a notification of use by the subscriber entity of any of the plural services associated with the instance of the product.

Example Embodiment N1.4

The node of Example Embodiment N1, wherein product instance lifecycle is a function of at least one of a time duration parameter and availability of a product resource allocated to the product instance.

Example Embodiment N2

A charging node for telecommunications system comprising:
a product handler configured to associate plural telecommunications services with a product and to generate a product instance for a subscriber entity, the product instance being available to the subscriber entity and having a product instance lifecycle;
an account manager configured to handle a payor account associated with the product instance;
a service manager configured to receive service reservations and at least one usage notification for the plural telecommunications services associated with the product instance;
a charging controller configured, during the product instance lifecycle:
to check, upon receiving a service reservation, whether the service reservation is for a first reserved service of the plural telecommunication services associated with the product instance and, if so, to reserve a fee for the product instance against the payor account; and thereafter to post the product fee to the payor account upon receiving a first notification of use by the subscriber entity of any of the plural services associated with the product instance; and thereafter, to permit use of all of the plural telecommunication services associated with the product instance to the subscribing entity during the product instance lifecycle without posting a further fee for use of the plural telecommunication services associated with the product instance.

Example Embodiment P1

A computer program product comprising instructions stored on non-transient computer-readable media which, when executed by a processor, perform the acts of:

upon receiving a service reservation, checking whether the service reservation is for a first reserved service of the plural telecommunication services associated with a product instance and, if so, reserving a fee for the product instance against a payor account, the product instance comprising an association of plural telecommunications services with a product available to a subscriber entity and having a product instance lifecycle;

upon receiving a first notification of use by the subscriber entity of any of the plural services associated with the product instance, posting the fee to the payor account; and thereafter permitting use of all of the plural telecommunication services associated with the product instance to the subscribing entity during the product instance lifecycle without posting a further fee for use of the plural telecommunication services associated with the product instance.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A computer-implemented method in a node of a telecommunications charging system comprising one or more processors, the one or more processors performing the steps of:

associating plural telecommunications services with a product and creating a product instance, the product instance being available to a subscriber entity and having a product instance lifecycle;

reserving a product fee for the product instance against a payor account upon receipt of a first service reservation of a first reserved service of the plural telecommunication services associated with the product instance;

posting the product fee against the payor account in conjunction with use of one of the plural telecommunication services associated with the product instance;

thereafter permitting use of all of the plural telecommunication services associated with the product instance to the subscribing entity during the product instance lifecycle without posting a further fee for use of the plural telecommunication services associated with the product instance; wherein upon receiving a subsequent reservation for another reserved service of the plural telecommunication services associated with the product instance, a further fee for the product instance is not reserved against the payor account;

upon receiving the reservation for the first reserved service of the plural telecommunication services associated with the product instance, enabling reservation of telecommunications resources for the first reserved service; and upon receiving the subsequent reservation for the another reserved service of the plural telecommunication services associated with the product instance, enabling reservation of telecommunications resources for the another reserved service.

2. The method of claim 1, wherein the subscriber entity comprises plural users.

3. The method of claim 1, further comprising:

upon receiving the reservation for the first reserved service of the plural telecommunication services associated with the product instance, granting a first quota of telecommunications resources for the first reserved service;

upon receiving the subsequent reservation for the another reserved service of the plural telecommunication services associated with the product instance, granting another quota of telecommunications resources for the another reserved service.

4. The method of claim 3, further comprising posting the fee against the payor account upon first reported utilization of a granted quota.

5. The method of claim 1, wherein product instance lifecycle is a function of at least one of a time duration parameter and availability of a product resource allocated to the product instance.

6. A charging node for telecommunications system wherein plural telecommunications services are associated with a product for which a product instance is allocated to a subscriber entity, the charging node comprising one or more processors, a memory embodying processor-executable instructions which when executed by the one or more processors, configured:

to reserve a product fee for the product instance against a payor account upon receipt of a first service reservation of a first reserved service of the plural telecommunication services associated with the product instance;

to post the product fee against the payor account in conjunction with use of one of the plural telecommunication services associated with the product instance; and thereafter to permit use of all of the plural telecommunication services associated with the product instance to the subscribing entity during a product instance lifecycle without posting a further product fee for use of the plural telecommunication services associated with the product instances;

to make no further product fee reservation upon receiving a subsequent reservation for another reserved service of the plural telecommunication services associated with the product instance;

to enable reservation of telecommunications resources for the first reserved service upon receiving the reservation for the first reserved service of the plural telecommunication services associated with the product instance; and to enable reservation of telecommunications resources for the another reserved service upon receiving the subsequent reservation for the another reserved service of the plural telecommunication services associated with the product instance.

7. The charging node of claim 6, further comprising:

a product handler configured to associate the plural telecommunications services with the product and to generate the product instance for the subscriber entity, the product instance being available to the subscriber entity and having the product instance lifecycle;

an account manager configured to handle the payor account associated with the product instance;

a service manager configured to receive the service reservations and at least one usage notification for the plural telecommunications services associated with the product instance.

8. The charging node of claim 7, wherein:

the product handler is configured to maintain in memory both product fee reservation information and product fee posting information for the instance of the product;

the account manager is further configured to post the product fee to the payor account when the product fee posting information comprises a product fee posting indicator;

the one or more processors further configured:

to store a product fee reservation indicator in the product fee reservation information only upon receiving the first service reservation for the first reserved service of the plural telecommunication services associated with the instance of the product;

upon receiving the subsequent reservation for the another reserved service of the plural telecommunication services associated with the instance of the product, to ascertain existence of the product fee reservation indicator and make no further fee reservation;

to store the product fee posting indicator in the product fee posting information only upon receiving a notification of use by the subscriber entity of any of the plural services associated with the instance of the product.

9. The charging node of claim 6, wherein the one or more processors are further configured:

upon receiving the reservation for the first reserved service of the plural telecommunication services associated with the product instance, to grant a first quota of telecommunications resources for the first reserved service;

upon receiving the subsequent reservation for the another reserved service of the plural telecommunication services associated with the product instance, to grant another quota of telecommunications resources for the another reserved service.

10. The charging node of claim 9, wherein the one or more processors are further configured to post the fee against the payor account upon first reported utilization of a granted quota.

11. The node of claim 6, wherein product instance lifecycle is a function of at least one of a time duration parameter and availability of a product resource allocated to the product instance.

12. A computer program product comprising instructions stored on non-transient computer-readable media which, when executed by a processor, perform the acts of:

associating plural telecommunications services with a product and generating a product instance for a subscriber entity, the product instance being available to the subscriber entity and having a product instance lifecycle;

reserving a product fee for the product instance against a payor account upon receipt of a first service reservation of a first reserved service of the plural telecommunication services associated with the product instance;

posting the product fee against the payor account in conjunction with use of one of the plural telecommunication services associated with the product instance; and thereafter permitting use of all of the plural telecommunication services associated with the product instance to the subscribing entity during the product instance lifecycle without posting a further fee for use of the plural telecommunication services associated with the product instance; wherein upon receiving a subsequent reservation for another reserved service of the plural telecommunication services associated with the product instance, a further fee for the product instance is not reserved against the payor account;

upon receiving the reservation for the first reserved service of the plural telecommunication services associated with the product instance, enabling reservation of telecommunications resources for the first reserved service; and upon receiving the subsequent reservation for the another reserved service of the plural telecommunication services associated with the product instance, enabling reservation of telecommunications resources for the another reserved service.

\* \* \* \* \*